US012560775B2

(12) United States Patent  
Muto et al.

(10) Patent No.: US 12,560,775 B2  
(45) Date of Patent: Feb. 24, 2026

(54) VOICE COIL MOTOR AND LENS BARREL

(71) Applicant: NIKON CORPORATION, Tokyo (JP)

(72) Inventors: Azusa Muto, Tokyo (JP); Kazutoshi Usui, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 335 days.

(21) Appl. No.: 18/259,170

(22) PCT Filed: Dec. 20, 2021

(86) PCT No.: PCT/JP2021/046965  
§ 371 (c)(1),  
(2) Date: Jun. 23, 2023

(87) PCT Pub. No.: WO2022/138543  
PCT Pub. Date: Jun. 30, 2022

(65) Prior Publication Data  
US 2024/0053572 A1 Feb. 15, 2024

(30) Foreign Application Priority Data

Dec. 25, 2020 (JP) ................................. 2020-217239

(51) Int. Cl.  
*G02B 7/04* (2021.01)  
*H02K 41/035* (2006.01)

(52) U.S. Cl.  
CPC ........... *G02B 7/04* (2013.01); *H02K 41/0354* (2013.01)

(58) Field of Classification Search  
CPC ........ G02B 7/04; G02B 7/08; H02K 41/0354; H02K 41/0356

USPC ......................................................... 359/824  
See application file for complete search history.

(56) References Cited

U.S. PATENT DOCUMENTS

| | | | |
|---|---|---|---|
| 2015/0062408 A1 | 3/2015 | Yano | |
| 2018/0027185 A1* | 1/2018 | Miller | G02B 27/646 348/208.11 |
| 2018/0364445 A1* | 12/2018 | Osaka | H04N 23/54 |
| 2019/0103799 A1 | 4/2019 | Kawanabe | |
| 2020/0117074 A1* | 4/2020 | Fujinaka | G02B 7/08 |

(Continued)

FOREIGN PATENT DOCUMENTS

| | | |
|---|---|---|
| JP | 2015-049334 A | 3/2015 |
| JP | 2020-064284 A | 4/2020 |
| WO | 2017/208876 A1 | 12/2017 |

OTHER PUBLICATIONS

Mar. 5, 2024 Office Action issued in Japanese Patent Application No. 2022-571433.

(Continued)

*Primary Examiner* — William R Alexander  
(74) *Attorney, Agent, or Firm* — Oliff PLC

(57) ABSTRACT

To provide a small-sized voice coil motor, the voice coil motor includes a first yoke and a second yoke each having a length in a first direction, a third yoke that has a length in the first direction and is disposed between the first yoke and the second yoke, a first magnet disposed on the first yoke, a second magnet disposed on the second yoke, and a coil that is penetrated by the third yoke and is movable in the first direction by magnetic forces of the first magnet and the second magnet, wherein the coil includes a first section in which a winding wire is linearly wound and a second section in which the wiring wire is wound in an arc shape.

20 Claims, 7 Drawing Sheets

(56) References Cited

U.S. PATENT DOCUMENTS

| | | | |
|---|---|---|---|
| 2022/0094853 A1* | 3/2022 | Xu | H04N 23/54 |
| 2025/0013126 A1* | 1/2025 | Mori | G03B 5/00 |

OTHER PUBLICATIONS

Feb. 22, 2022 International Search Report issued in International Patent Application No. PCT/JP2021/046965.

Jun. 13, 2023 International Preliminary Report on Patentability issued in International Patent Application No. PCT/JP2021/046965.

* cited by examiner

FIG. 4A
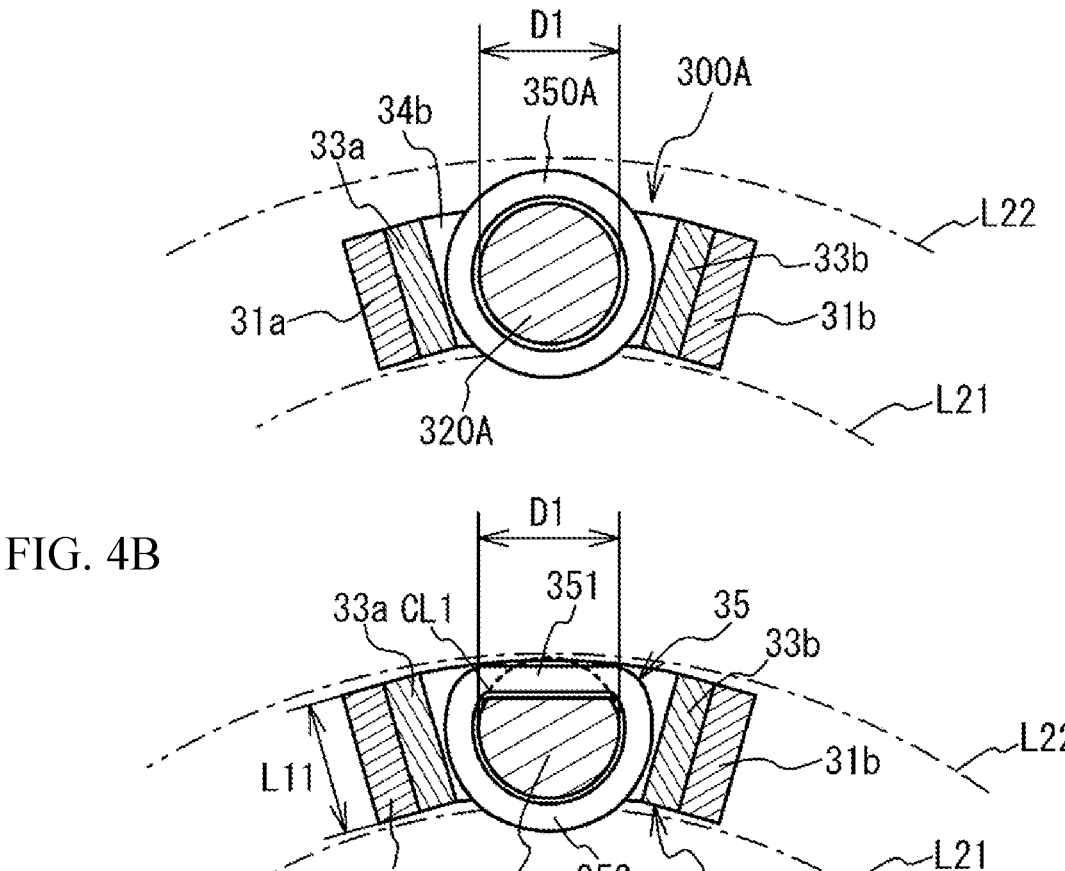
FIG. 4B
FIG. 4C
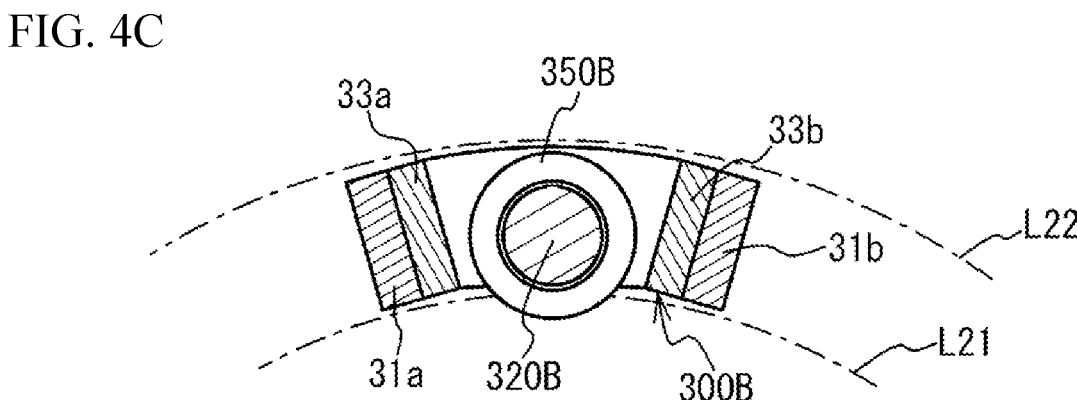

FIG. 5A
31a          31b
OPTICAL AXIS
DIRECTION
341b   34b
FIG. 5B
34a   321a   30
33a
35
31a
32   34b
33b
31b
d2
d1
OPTICAL AXIS
DIRECTION
FIG. 5C
321a
32
OPTICAL
AXIS
DIRECTION
321b
FIG. 5D
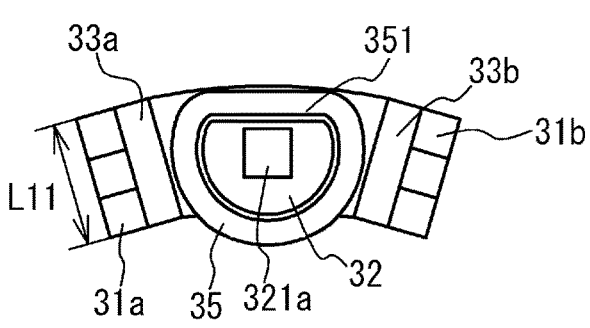
33a   351   33b
31b
L11
31a   35   321a   32
FIG. 5E
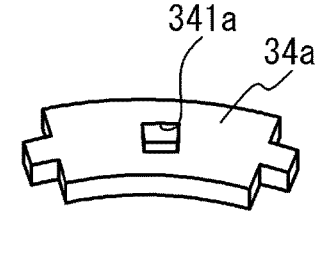
341a   34a

VOICE COIL MOTOR AND LENS BARREL

TECHNICAL FIELD

The present disclosure relates to a voice coil motor and a lens barrel.

BACKGROUND ART

A lens barrel employing a voice coil motor as a lens driving device has been proposed (for example, Patent Document 1). It is desirable to reduce the size of a voice coil motor used in a lens barrel.

PRIOR ART DOCUMENT

Patent Document

Patent Document 1: Japanese Patent Application Laid-Open No. 2015-49334

SUMMARY OF THE INVENTION

According to a first aspect, there is provided a voice coil motor including: a first yoke and a second yoke each having a length in a first direction; a third yoke that has a length in the first direction and is disposed between the first yoke and the second yoke; a first magnet disposed on the first yoke; a second magnet disposed on the second yoke; and a coil that is penetrated by the third yoke and is movable in the first direction by magnetic forces of the first magnet and the second magnet, wherein the coil includes a first section in which a winding wire is linearly wound and a second section in which the wiring wire is wound in an arc shape.

According to a second aspect, there is provided a lens barrel including the above voice coil motor.

Note that the configurations of the embodiments described below may be appropriately modified, and at least one of the components may be replaced with another component. Furthermore, constituent elements whose arrangement is not particularly limited are not limited to the arrangement disclosed in the embodiment, and can be arranged at positions where their functions can be achieved.

BRIEF DESCRIPTION OF THE DRAWINGS

FIG. 4A is a cross-sectional view of a voice coil motor in accordance with a first comparative example, FIG. 4B is a cross-sectional view of the voice coil motor, and FIG. 4C is a cross-sectional view of a voice coil motor in accordance with a second comparative example;

FIG. 5A is a perspective view of a first side yoke, a second side yoke, and a lower yoke, FIG. 5B is a schematic front view of the voice coil motor, FIG. 5C is a side view of the center yoke, FIG. 5D is a view of the voice coil motor from which an upper yoke is removed as viewed from the upper yoke side, and FIG. 5E is a perspective view of the upper yoke;

MODES FOR CARRYING OUT THE INVENTION

Hereinafter, a lens barrel 100 in accordance with an embodiment will be described in detail with reference to the drawings. In each drawing, illustration of some elements may be omitted in order to facilitate understanding.

Figure 1:
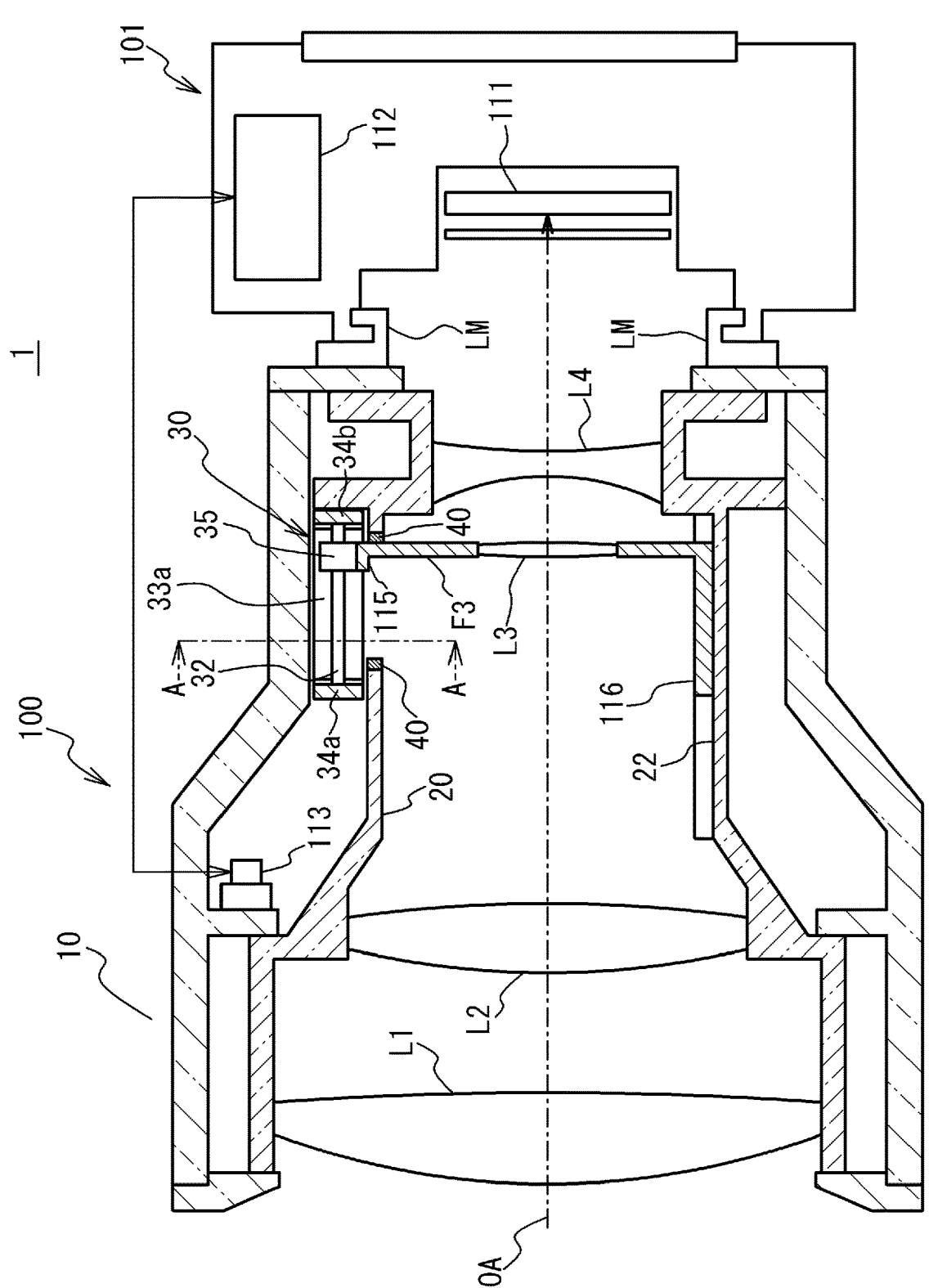
FIG. 1 is a diagram illustrating a camera including a lens barrel in accordance with an embodiment and a camera body.

FIG. 1 is a diagram illustrating a camera 1 including the lens barrel 100 in accordance with the present embodiment and a camera body 101. In the present embodiment, the lens barrel 100 is attachable to and detachable from the camera body 101, but this does not intend to suggest any limitation, and the lens barrel 100 and the camera body 101 may be integrated.

The camera body 101 includes an image sensor 111, a control unit 112, and the like inside. The image sensor 111 includes a photoelectric conversion element such as a charge coupled device (CCD), and converts a subject image formed by the imaging optical system (the lens barrel 100 attached to the camera body 101) into an electric signal.

The control unit 112 includes a central processing unit (CPU) and the like, and integrally controls operations of the camera 1 related to photographing including focus driving in the camera body 101 and the attached lens barrel 100 as a whole.

As illustrated in FIG. 1, the lens barrel 100 of the present embodiment includes a first fixed barrel 10 and a second fixed barrel 20 disposed radially further inward than the first fixed barrel 10. In the present embodiment, the first fixed barrel 10 is composed of a plurality of components, but may be composed of one component. As illustrated in FIG. 1, a lens mount LM that allows the lens barrel 100 to be attached to and detached from the camera body 101 is fixed to the first fixed barrel 10.

Further, the lens barrel 100 includes a plurality of lenses L1 to L4 sequentially arranged along the common optical axis OA. The lens L3 is held by the lens holding frame F3, and the other lenses are held by the second fixed barrel 20. Each of the lenses L1 to L4 may be composed of a plurality of lenses.

In the present embodiment, the lens L3 is a focus lens and is moved in the optical axis direction to adjust the focus. The lens L3 is provided so as to be moved in the optical axis direction by a voice coil motor (VCM) 30 disposed inside the lens barrel 100.

The lens holding frame F3 includes an engagement portion 116 protruding in a direction intersecting the optical axis OA. The engagement portion 116 engages with a straight groove 22 of the second fixed barrel 20. The straight groove 22 extends in the optical axis direction. Thus, rotation of the lens holding frame F3 around the optical axis OA is restricted, and the lens holding frame F3 is guided by the straight groove 22 to move straight in the optical axis direction. The lens holding frame F3 may be guided in the optical axis direction not by the straight groove 22 but by a guide bar extending in the optical axis direction.

The VCM 30 is driven by a drive device 113. The drive device 113 controls focus driving of the lens L3 under the control by the control unit 112 of the camera body 101. Specifically, the drive device 113 generates drive signals for the VCM 30 based on the position information of the lens L3 input from a position detection mechanism (not illustrated) such as an optical encoder or magnetic encoder and the target position information of the lens L3 input from the control unit 112 of the camera body 101, and outputs the generated drive signals to the VCM 30.

The VCM 30 linearly drives the lens L3 in the optical axis direction according to the drive signal. Although details will be described later, as illustrated in FIG. 1, the lens holding frame F3 is connected to a coil 35 of the VCM 30. Specifically, the lens holding frame F3 is connected to the coil 35 through a connection portion 115 of the lens holding frame F3 by, for example, an adhesive. Thus, when the coil 35 is linearly driven in the optical axis direction, the lens holding frame F3 is linearly driven in the optical axis direction, and the position of the lens L3 in the optical axis direction is changed.

When the drive signal for the VCM 30 is OFF, the coil 35 of the VCM 30 has no holding force to maintain its position, and thus moves freely. Therefore, when the lens barrel 100 is oriented upward or downward, the coil 35 may move due to the weights of the lens holding frame F3 and the lens L3, and the lens holding frame F3 may collide with the second fixed barrel 20 and generate an impact sound. Therefore, as illustrated in FIG. 1, a cushioning member 40 is provided in a portion of the second fixed barrel 20 overlapping the lens holding frame F3 in the optical axis direction. As a result, the lens holding frame F3 collides with the cushioning member 40, which reduces the impact and the impact sound.

In the camera 1 including the camera body 101 and the lens barrel 100 as described above, when a shutter button (not illustrated) is pressed (a release operation or a focusing operation is performed), the control unit 112 in the camera body 101 performs control such as focus driving of the lens barrel 100 through the drive device 113. The image sensor 111 converts light of the subject image formed by the lens barrel 100 into an electric signal, and the image data is recorded in a memory (not illustrated) provided in the camera body 101 (that is, shooting is performed).

Figure 2A:
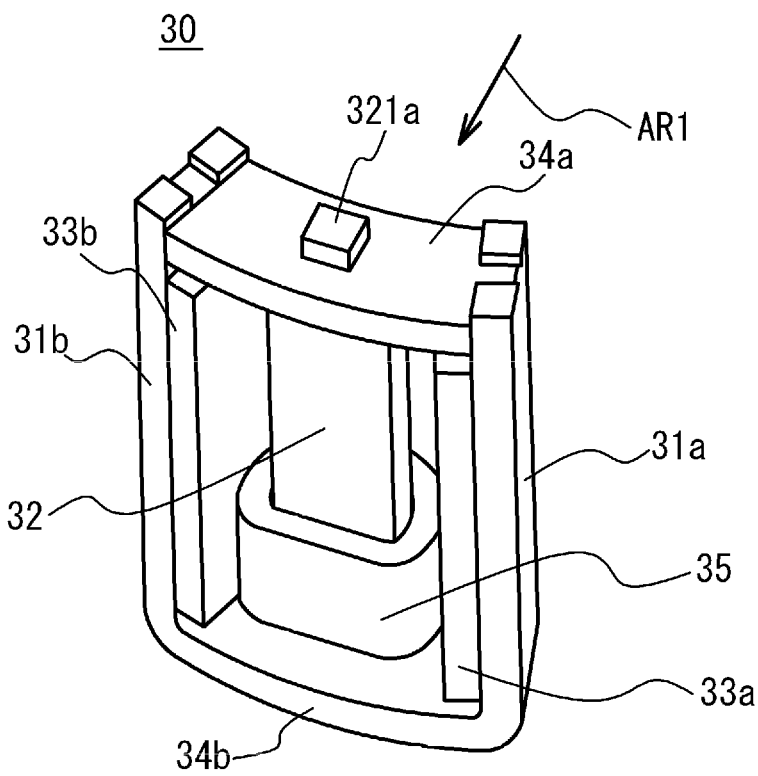
FIG. 2A is a perspective view illustrating a structure of a voice coil motor.
Figure 2B:
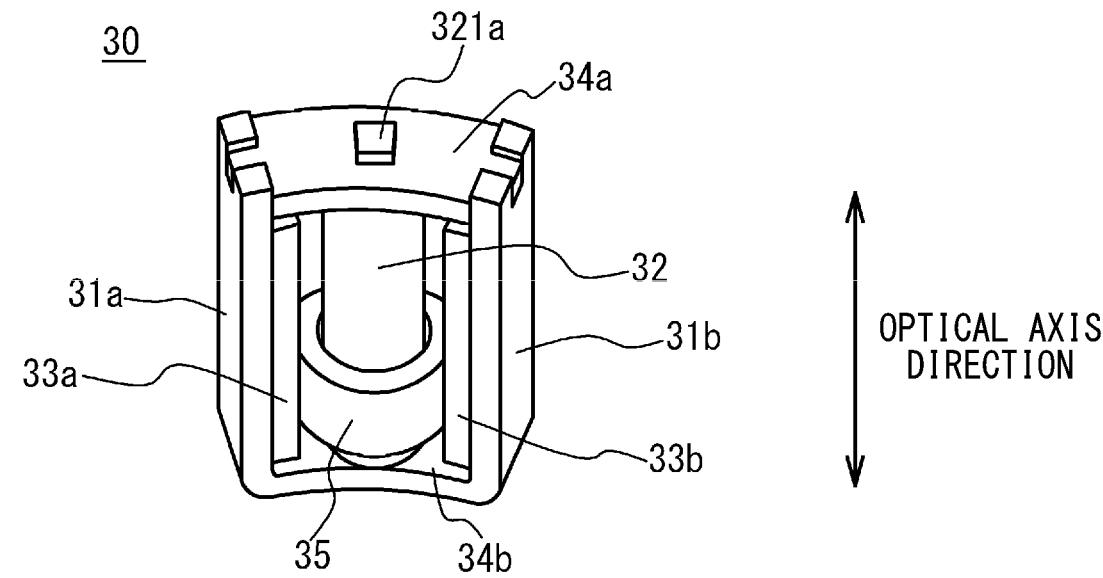
FIG. 2B is a view of the voice coil motor as viewed from a direction indicated by an arrow AR1 in FIG. 2A.
Figure 3A:
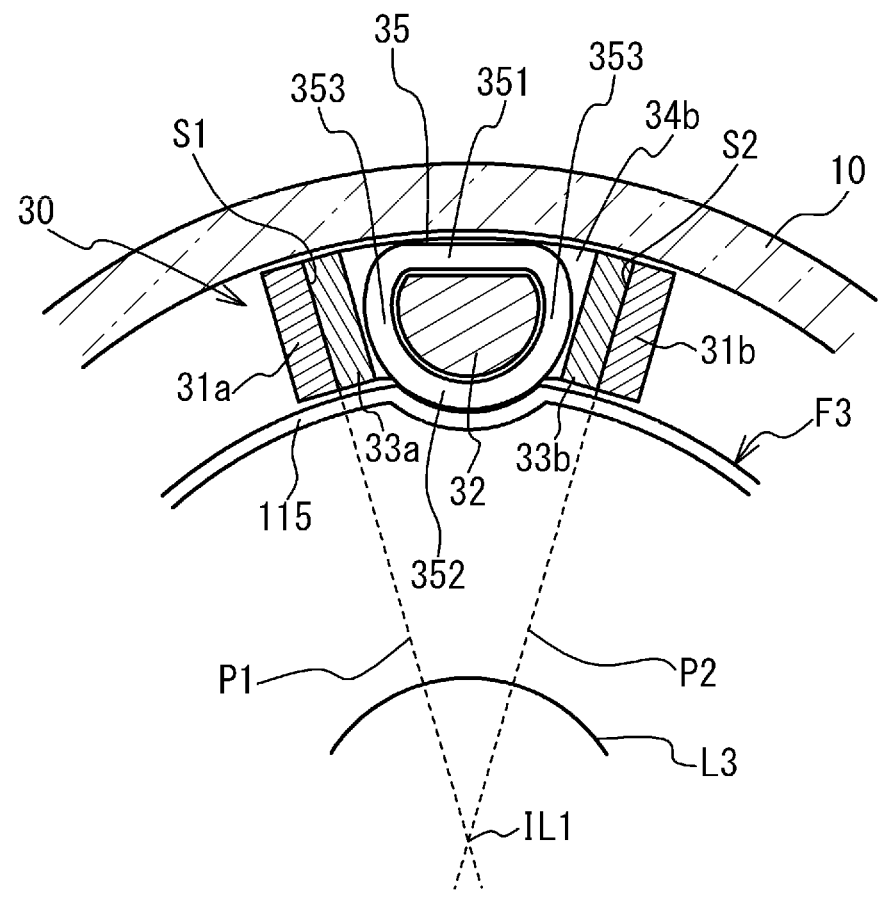
FIG. 3A is a cross-sectional view taken along line A-A in FIG. 1.
Figure 3B:
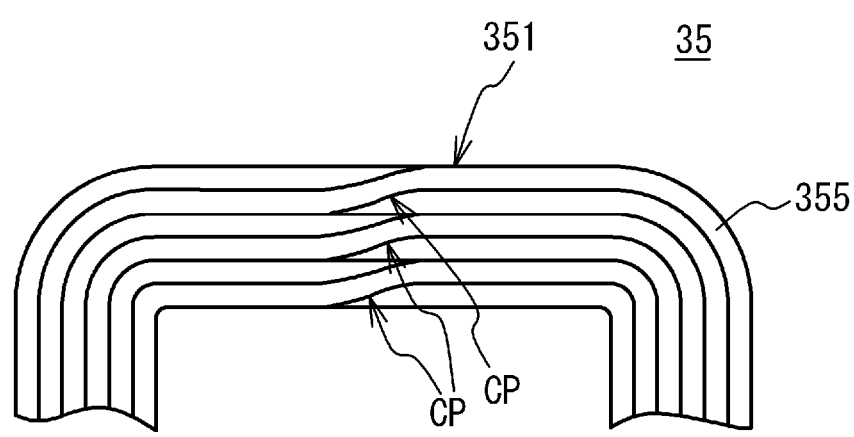
FIG. 3B is a partially enlarged view of a coil.

Next, the configuration of the VCM 30 that drives the lens L3 is described. FIG. 2A is a perspective view illustrating the configuration of the VCM 30, and FIG. 2B is a view of the VCM 30 as viewed from the direction indicated by an arrow AR1 in FIG. 2A. FIG. 3A is a cross-sectional view taken along line A-A in FIG. 1, and FIG. 3B is a partially enlarged view of the coil 35.

As illustrated in FIG. 2A and FIG. 2B, the VCM 30 in accordance with the present embodiment includes a first side yoke 31a and a second side yoke 31b each having a length in the optical axis direction, and a center yoke 32 that has a length in the optical axis direction and is disposed between the first side yoke 31a and the second side yoke 31b.

The VCM 30 also includes an upper yoke 34a connecting first ends of the first side yoke 31a, the second side yoke 31b, and the center yoke 32 in the optical axis direction, and a lower yoke 34b connecting second ends of the first side yoke 31a, the second side yoke 31b, and the center yoke 32 in the optical axis direction. This structure forms a closed magnetic circuit.

A first magnet 33a is disposed on a side surface at the center yoke 32 side of the first side yoke 31a, and a second magnet 33b is disposed on a side surface at the center yoke 32 side of the second side yoke 31b.

For example, the first magnet 33a is disposed so that the side closer to the center yoke 32 is the north pole, and the second magnet 33b is also disposed so that the side closer to the center yoke 32 is the north pole. This structure forms a magnetic path in which magnetic fluxes enter the center yoke 32 from the north poles of the first magnet 33a and the second magnet 33b, pass through the upper yoke 34a and the lower yoke 34b and the first side yoke 31a and the second side yoke 31b, and return to the south poles of the first magnet 33a and the second magnet 33b, respectively.

The VCM 30 includes the coil 35 penetrated by the center yoke 32. As illustrated in FIG. 3A, the coil 35 of the VCM 30 in the present embodiment has a substantially D shape. Specifically, the coil 35 has a straight section 351 in which the winding wire is linearly wound, a curved section 352 in which the winding wire is wound in an arc shape, and connection sections 353 that connect the straight section 351 and the curved section 352. The curved section 352 faces the straight section 351 with the center yoke 32 interposed therebetween. The direction of the current flowing through the straight section 351 is the direction from the first side yoke 31a to the second side yoke 31b or the direction from the second side yoke 31b to the first side yoke 31a.

The plane P1 including the side surface S1 facing the first magnet 33a of the first side yoke 31a intersects with the plane P2 including the side surface S2 facing the second magnet 33b of the second side yoke 31b. The center yoke 32 is located between the straight section 351 of the coil 35 and the intersection line IL1 between the plane P1 and the plane P2. That is, the straight section 351 of the coil 35 is located at the first fixed barrel 10 side (outer peripheral side). As described above, the coil 35 has the straight section 351, and the straight section 351 is located at the outer peripheral side, which reduces the size of the VCM 30. Further, a sufficient driving force can be secured. This point will be described in detail.

FIG. 4A is a cross-sectional view of a VCM 300A in accordance with a first comparative example, FIG. 4B is a cross-sectional view of the VCM 30, and FIG. 4C is a cross-sectional view of a VCM 300B in accordance with a second comparative example. FIG. 4A to FIG. 4C correspond to cross-sectional views taken along line A-A in FIG. 1. In FIG. 4A to FIG. 4C, the inner peripheral surface of the first fixed barrel 10 is indicated by a chain line L22, and the outer periphery of the lens holding frame F3 is indicated by a chain line L21.

As illustrated in FIG. 4A, a coil 350A of the VCM 300A in accordance with the first comparative example does not have a straight section in which the winding wire is linearly wound, and has a cylindrical shape. The number of layers of the winding wire of the coil 350A (the thickness of the coil 350A in the radial direction) is the same as the number of layers of the winding wire of the coil 35 in accordance with the embodiment. A center yoke 320A of the first comparative example has a cylindrical shape, and its diameter is equal to the diameter D1 of the virtual cylinder CL1 (indicated by a dashed line in FIG. 4B) whose outer peripheral surface coincides with a part of the outer peripheral surface of the center yoke 32 of the VCM 30. The sizes and arrangements of the first side yoke 31a and the second side yoke 31b, the upper yoke 34a and the lower yoke 34b, and the first magnet 33a and the second magnet 33b are the same as those of the VCM 30.

In the first comparative example, since the coil 350A does not have a straight section, a part of the coil 350A protrudes radially further outward than the first side yoke 31a, the second side yoke 31b, the upper yoke 34a, and the lower yoke 34b. As a result, the size of the VCM 300A in the radial direction of the lens L3 is larger than that of the VCM 30. Therefore, when the VCM 300A is used, the inner diameter of the first fixed barrel 10 is larger than when the VCM 30 is used, resulting in a larger lens barrel.

In contrast, in the VCM 30 in accordance with the present embodiment, as illustrated in FIG. 4B, since the coil 35 has the straight section 351, the coil 35 does not protrude radially further outward than the first side yoke 31*a*, the second side yoke 31*b*, the upper yoke 34*a*, or the lower yoke 34*b*. This reduces the size of the VCM 30 in the radial direction of the lens. As a result, the inner diameter of the first fixed barrel 10 can be reduced, thus miniaturizing the lens barrel 100.

In the VCM 300B of the second comparative example illustrated in FIG. 4C, the diameter and position of a center yoke 320B are adjusted so that a cylindrical coil 350B does not protrude from the first side yoke 31*a*, the second side yoke 31*b*, the upper yoke 34*a*, and the lower yoke 34*b* at the outer peripheral side. In the VCM 300B, the number of layers of the winding wire of the coil 350B (the radial thickness of the coil 350B) is the same as the number of layers of the winding wire of the coil 35 in accordance with the embodiment. In the VCM 300B of the second comparative example, the size of the VCM 300B in the radial direction can be reduced, but the diameter of the center yoke 320B is reduced. As a result, if the sizes and arrangements of the first side yoke 31*a* and the second side yoke 31*b*, the upper yoke 34*a* and the lower yoke 34*b*, and the first magnet 33*a* and the second magnet 33*b* are set to be the same as those of the VCM 30, the distance between each of the first side yoke 31*a* and the first magnet 33*a* and the center yoke 320B and the distance between each of the second side yoke 31*b* and the second magnet 33*b* and the center yoke 320B become long, and sufficient driving force may not be obtained. More specifically, in the direction from the first magnet 33*a* to the center yoke 320B, the magnitude of the magnetic force of the first magnet 33*a* in the vicinity of the center yoke 320B is inversely proportional to the square of the distance between the first magnet 33*a* and the center yoke 320B according to Coulombs' law. Similarly, in the direction from the second magnet 33*b* to the center yoke 320B, the magnitude of the magnetic force of the second magnet 33*b* in the vicinity of the center yoke 320B is inversely proportional to the square of the distance between each of the second side yoke 31*b* and the second magnet 33*b* and the center yoke 320B according to Coulomb's law. Therefore, as the distance between the first magnet 33*a* and the center yoke 320B and the distance between the second magnet 33*b* and the center yoke 320B increase, the magnetic force applied to the coil 35 decreases, and the driving force of the coil 35 decreases. In addition, for example, even if the first side yoke 31*a* and the second side yoke 31*b* and the first magnet 33*a* and the second magnet 33*b* are disposed close to the center yoke 320B, since the diameter of the center yoke 320B is small, it is difficult for the magnetic flux to flow in the center yoke 320B, and there is a concern that a sufficient driving force cannot be obtained.

On the other hand, in the VCM 30 of the present embodiment, as illustrated in FIG. 4B, the diameter of the center yoke 32 can be increased. For example, the diameter D1 of the virtual cylinder CL1 whose outer peripheral surface coincides with a part of the outer peripheral surface of the center yoke 32 can be made larger than the length L11 in the longitudinal direction of the rectangular shape when the first side yoke 31*a* and the second side yoke 31*b* are viewed from the optical axis direction. Therefore, the magnetic flux can easily flow in the center yoke 32. In addition, since the distance between each of the first side yoke 31*a* and the first magnet 33*a* and the center yoke 32 and the distance between each of the second side yoke 31*b* and the second magnet 33*b* and the center yoke 320B can be shortened, the driving force of the VMC 30 can be improved.

As described above, since the coil 35 has the straight section 351, it is possible to downsize the VCM 30 and the lens barrel 100. Further, the VCM 30 can secure a sufficient driving force.

Referring back to FIG. 3B, the coil 35 is an aligned multilayer winding coil, and cross points CP at which winding wires 355 of the coil 35 cross each other (a section where the winding wire 355 of the (n+1)-th layer crosses over the winding wire 355 of the n-th layer) are located in the straight section 351. Since the coil 35 slightly expands at the cross point CP (the coil 35 becomes thicker in the radial direction), if the cross points CP are located in the curved section 352 bonded to the lens holding frame F3, there is a possibility that the lens holding frame F3 and the coil 35 cannot be accurately positioned. More specifically, when the section where the cross points CP are located is set to the curved section 352 of the coil 35, and the curved section 352 and the lens holding frame F3 are bonded to each other, the coil 35 may be bonded obliquely to the lens holding frame F3 or desired positioning cannot be performed. In the present embodiment, the cross points CP are positioned in the straight section 351, which is not used for positioning the coil 35 and the lens holding frame F3, so that the coil 35 and the lens holding frame F3 can be accurately bonded to each other at a designated position.

A drive signal (current) is input to the coil 35 from the drive device 113 (see FIG. 1) provided in the lens barrel 100. When a current flows through the coil 35, the coil 35 moves in the optical axis direction due to the magnetic forces of the first magnet 33*a* and the second magnet 33*b*. More specifically, the coil 35 moves in the optical axis direction due to the electromagnetic interaction between the coil 35 through which the current flows and the first magnet 33*a* and the second magnet 33*b*. By changing the direction of the current flowing through the coil 35, the moving direction of the coil 35 can be switched between the subject side and the camera body 101 side. Further, the driving force and the moving speed of the coil 35 can be changed by changing the value of the current flowing through the coil 35.

Each component of the VCM 30 will now be described in more detail. FIG. 5A is a perspective view of the first side yoke 31*a*, the second side yoke 31*b*, and the lower yoke 34*b*, FIG. 5B is a schematic front view of the VCM 30, FIG. 5C is a side view of the center yoke 32, FIG. 5D is a view of the VCM 30 from which the upper yoke 34*a* is removed as viewed from the upper yoke 34*a* side, and FIG. 5E is a perspective view of the upper yoke.

As illustrated in FIG. 5A, the first side yoke 31*a*, the second side yoke 31*b*, and the lower yoke 34*b* are integrally formed by one member. The first side yoke 31*a*, the second side yoke 31*b*, and the lower yoke 34*b* can be integrally formed by, for example, bending a flat plate of a steel plate cold commercial (SPCC) cut into a predetermined size by press working.

The first magnet 33*a* and the second magnet 33*b* used in the VCM 30 have strong magnetic force. Therefore, when the first side yoke 31*a*, the second side yoke 31*b*, and the lower yoke 34*b* are formed by separate members, there is a possibility that the first side yoke 31*a* and the second side yoke 31*b* to which the first magnet 33*a* and the second magnet 33*b* are attached, respectively and the other members (the upper yoke 34*a*, the lower yoke 34*b*, and the center yoke 32) may be magnetically attracted to each other at the time of assembly, which makes assembly difficult. Alternatively, a special jig for preventing the positions of the members from being displaced by the magnetic force may be required.

In contrast, in the present embodiment, since the first side yoke 31a, the second side yoke 31b, and the lower yoke 34b are integrally formed by one member, even after the first magnet 33a and the second magnet 33b are attached to the first side yoke 31a and the second side yoke 31b, respectively, the first side yoke 31a, the second side yoke 31b, and the lower yoke 34b can maintain their positions and postures. Therefore, attachment of the center yoke 32, attachment of the coil 35, and attachment of the upper yoke 34a are facilitated. That is, the assembly of the VCM 30 is facilitated.

When the first side yoke 31a, the second side yoke 31b, and the lower yoke 34b are integrally formed by one member, as illustrated in FIG. 5B, the connection portion between the lower yoke 34b and the first side yoke 31a and the connection portion between the lower yoke 34b and the second side yoke 31b are curved, resulting in a difficulty for the magnetic flux to flow. On the other hand, magnetic flux flows more easily through the connection portion between the first side yoke 31a and the upper yoke 34a and the connection portion between the second side yoke 31b and the upper yoke 34a than the connection portions with the lower yoke 34b.

Figure 6:
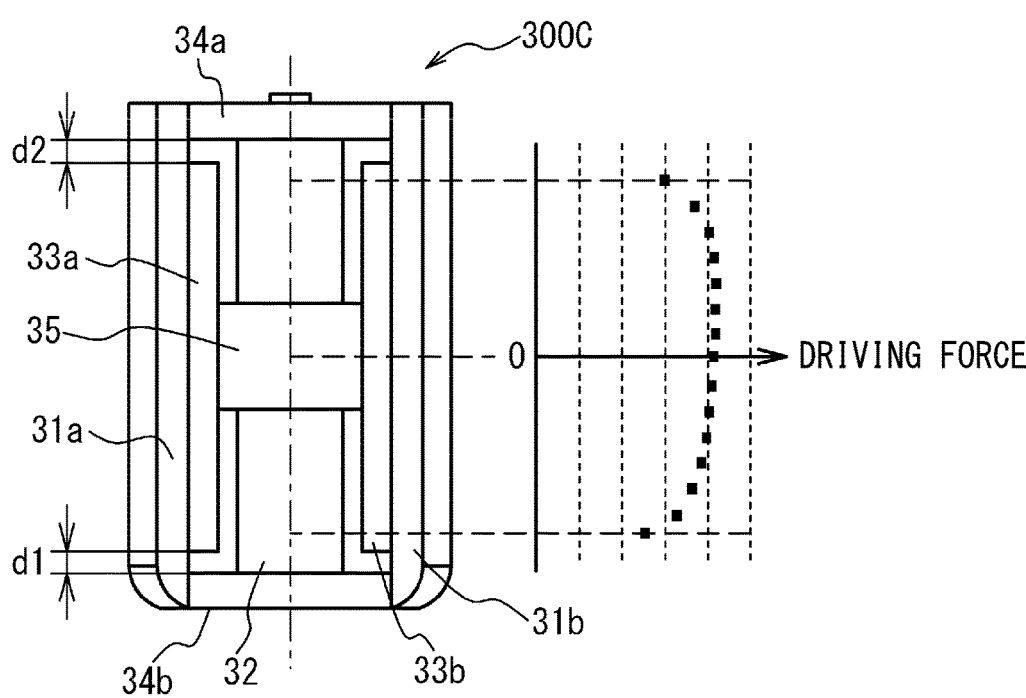
FIG. 6 is a diagram for describing a driving force of a coil in a voice coil motor in accordance with a third comparative example.

FIG. 6 is a diagram for describing the driving force of the coil 35 in a VCM 300C in accordance with a third comparative example. In the VCM 300C, the first magnet 33a and the second magnet 33b are disposed so that the distance d2 between each of the first magnet 33a and the second magnet 33b and the upper yoke 34a is equal to the distance d1 between each of the first magnet 33a and the second magnet 33b and the lower yoke 34b. Other configurations are the same as those of the VCM 30. In FIG. 6, a graph illustrating the driving force of the coil 35 at the position to which the coil 35 has moved is presented on the right side of the VCM 300C. In the graph, a position where the center of the coil 35 in the extending direction coincides with the center of the center yoke 32 in the extending direction is set to 0, and when the center of the coil 35 is moved to the upper yoke 34a side or the lower yoke 34b side, the driving force of the coil 35 at the position where the coil 35 has moved is illustrated. As illustrated in FIG. 6, when the first magnet 33a and the second magnet 33b are disposed so that the distance d2 from the upper yoke 34a and the distance d1 from the lower yoke 34b are equal to each other, the driving force at the lower yoke 34b side is lower than the driving force at the upper yoke 34a side.

Therefore, in the present embodiment, the first magnet 33a and the second magnet 33b are disposed closer to the lower yoke 34b than to the upper yoke 34a so that the driving force is uniform in the optical axis direction. More specifically, as illustrated in FIG. 5B, the first magnet 33a and the second magnet 33b are arranged so that the distance d1 between each of the first magnet 33a and the second magnet 33b and the lower yoke 34b is shorter than the distance d2 between each of the first magnet 33a and the second magnet 33b and the upper yoke 34a. This configuration allows the driving force of the VCM 30 to be uniform in the optical axis direction, and the lens L3 can be therefore stably driven.

Next, the configuration of the center yoke 32 will be described. The material of the center yoke 32 is, for example, steel structure (SS) 400.

As illustrated in FIG. 5D, the surface of the center yoke 32 facing the straight section 351 of the coil 35 is substantially parallel to the straight section 351. More specifically, the surface of the center yoke 32 facing the straight section 351 of the coil 35 is substantially parallel to the surface of the straight section 351 at the center yoke 32 side. Thus, the substantially D-shaped coil 35 can smoothly move in the optical axis direction.

As illustrated in FIG. 5C, the center yoke 32 has protruding portions 321a and 321b used for positioning the center yoke 32 on respective end surfaces in the optical axis direction. Specifically, the protruding portions 321a and 321b are engaged with engagement portions 341a and 341b (see FIG. 5A and FIG. 5E) formed on the upper yoke 34a and the lower yoke 34b, respectively, so that the center yoke 32 is positioned. In the present embodiment, the engagement portions 341a and 341b are through holes penetrating through the upper yoke 34a and the lower yoke 34b, respectively, and are fitted to the protruding portions 321a and 321b. Therefore, the center yoke 32 is positioned by inserting the protruding portions 321a and 321b into the through holes (the engagement portions 341a and 341b), respectively. The engagement portions 341a and 341b may not necessarily penetrate through the upper yoke 34a or the lower yoke 34b.

As described above in detail, the VCM 30 in accordance with the present embodiment includes the first side yoke 31a and the second side yoke 31b each having a length in the optical axis direction, the center yoke 32 that has a length in the optical axis direction and is disposed between the first side yoke 31a and the second side yoke 31b, the first magnet 33a disposed on the first side yoke 31a, the second magnet 33b disposed on the second side yoke 31b, and the coil 35 that is penetrated by the center yoke 32 and is movable in the optical axis direction by the magnetic forces of the first magnet 33a and the second magnet 33b. The coil 35 includes the straight section 351 in which the winding wire is linearly wound.

As described above, since the coil 35 has the straight section 351, the VCM 30 can be reduced in size. In addition, compared to a VCM including a coil that does not have the straight section 351, the driving force of the VCM 30 can be improved.

According to the present embodiment, the coil 35 has the curved section 352 in which the winding wire is wound in an arc shape. As a result, since the curved section 352 protrudes radially further inward than the upper yoke 34a and the lower yoke 34b, the lens holding frame F3 can be easily bonded to the coil 35.

In the present embodiment, the surface of the center yoke 32 facing the straight section 351 of the coil 35 is substantially parallel to the straight section 351. Thus, the coil 35 having the straight section 351 can smoothly move along the center yoke 32.

Further, in the present embodiment, the first side yoke 31a and the second side yoke 31b have a rectangular shape when viewed from the optical axis direction, and the diameter D1 of the virtual cylinder CL1 whose outer peripheral surface coincides with a part of the outer peripheral surface of the center yoke 32 is larger than the length L11 of the rectangular shape in the longitudinal direction. This configuration allows the distance between each of the first magnet 33a and the second magnet 33b and the center yoke 32 to be shortened, thereby improving the driving force of the VCM 30.

In the present embodiment, the cross point CP where the winding wires of the coil 35 intersect with each other is located in the straight section 351. At the cross point CP, the coil 35 expands radially outward. By positioning the cross point CP in the straight section 351, the coil 35 can be accurately disposed at the designated position as compared with the case where the cross point CP is positioned in the curved section 352 bonded to the lens holding frame F3. Further, since the section where the cross point CP is located is not in contact with the first magnet 33*a* nor the second magnet 33*b*, the coil 35 can be moved smoothly.

In the present embodiment, the VCM 30 includes the upper yoke 34*a* connecting first ends of the first side yoke 31*a*, the second side yoke 31*b*, and the center yoke 32 in the optical axis direction, and the lower yoke 34*b* connecting second ends of the first side yoke 31*a*, the second side yoke 31*b*, and the center yoke 32 in the optical axis direction. The first side yoke 31*a*, the second side yoke 31*b*, and the lower yoke 34*b* are integrally formed by one member, and in the optical axis direction, the distance d1 between the upper yoke 34*a* and each of the first magnet 33*a* and the second magnet 33*b* is shorter than the distance d2 between the lower yoke 34*b* and each of the first magnet 33*a* and the second magnet 33*b*. As a result, the ease of flow of the magnetic flux at the connection portion between each of the first side yoke 31*a* and the second side yoke 31*b* and the lower yoke 34*b* can be made substantially equal to the ease of flow of the magnetic flux at the connection portion between each of the first side yoke 31*a* and the second side yoke 31*b* and the upper yoke 34*a*, so that the driving force of the VCM 30 can be made uniform in the optical axis direction.

In addition, in the present embodiment, the center yoke 32 has the protruding portions 321*a* and 321*b* on respective end surfaces in the optical axis direction, and the upper yoke 34*a* and the lower yoke 34*b* have the engagement portions 341*a* and 341*b* that engage with the protruding portions 321*a* and 321*b*, respectively. Thus, the center yoke 32 can be positioned.

In the above embodiment, the winding wire is wound in a curved shape in the connection section 353, but may be wound in a linear shape.

In the above embodiment, the material of the center yoke 32 is different from the materials of the first side yoke 31*a* and the second side yoke 31*b*, but may be the same as or different from the materials of the first side yoke 31*a* and the second side yoke 31*b*. However, the material of the center yoke 32 is preferably a material having a higher saturation flux density than the materials of the first side yoke 31*a* and the second side yoke 31*b*. This improves the flow of magnetic flux in the center yoke 32 and increases the driving force of the VCM 30.

Figure 7A:
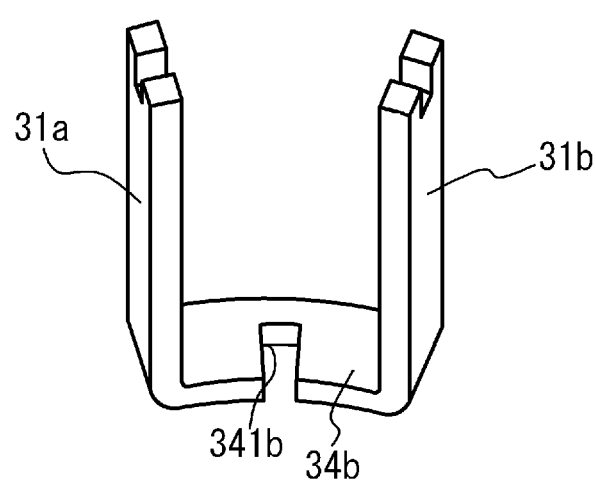
FIG. 7A and FIG. 7B are views illustrating another example of the lower yoke and the upper yoke.
Figure 7B:
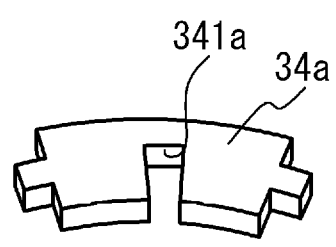
Figure 7C:
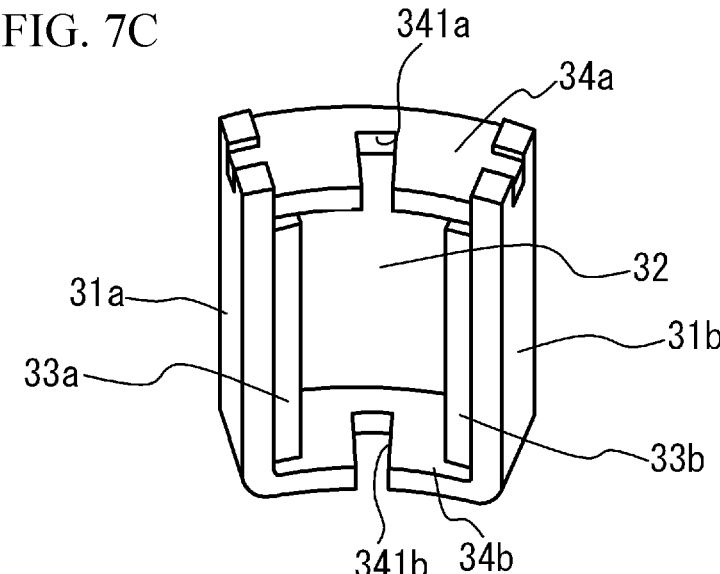
FIG. 7C is a view for describing the assembly of the voice coil motor.

In the above embodiment, as illustrated in FIG. 7A and FIG. 7B, the engagement portions 341*a* and 341*b* of the upper yoke 34*a* and the lower yoke 34*b* may be opened toward the lens L3. This allows the center yoke 32 to be disposed between the first side yoke 31*a* and the second side yoke 31*b* by, for example, attaching the first magnet 33*a*, the second magnet 33*b*, and the upper yoke 34*a* to the first side yoke 31*a*, the second side yoke 31*b*, and the lower yoke 34*b* that are integrally formed as illustrated in FIG. 7C, and then inserting the protruding portions 321*a* and 321*b* of the center yoke 32 penetrating through the coil 35 into the engagement portions 341*a* and 341*b* from the opening side of the engagement portions 341*a* and 341*b*. In addition, the center yoke 32 can be positioned by disposing the center yoke 32 between the first side yoke 31*a* and the second side yoke 31*b* and then bonding the protruding portions 321*a* and 321*b* of the center yoke 32 to the upper yoke 34*a* and the lower yoke 34*b*, respectively. Therefore, the VCM can be easily assembled. The engagement portions 341*a* and 341*b* may be opened not toward the lens L3 but toward the first fixed barrel 10.

In the above embodiment, the second fixed barrel 20 that houses the lens holding frame F3 may be a movable barrel that is linearly movable in the optical axis direction. In the above embodiment and variations thereof, the lens barrel 100 may be a single-focus lens or a zoom lens. In addition, the VCM 30 may be used in a device other than the lens barrel.

The embodiments described above are examples of preferred implementations. However, the present invention is not limited thereto, and various modifications can be made without departing from the scope of the present invention, and arbitrary constituent elements may be combined.

DESCRIPTION OF REFERENCE NUMERALS

1 camera
30 voice coil motor
31*a* first side yoke
31*b* second side yoke
32 center yoke
33*a* first magnet
33*b* second magnet
34*a* upper yoke
34*b* lower yoke
35 coil
100 lens barrel
101 camera body
351 straight section
352 curved section
355 winding wire
L3 lens
F3 lens holding frame

The invention claimed is:

1. A voice coil motor comprising:
a first yoke and a second yoke each having a length in a first direction;
a third yoke that has a length in the first direction and is disposed between the first yoke and the second yoke;
a first magnet disposed on the first yoke;
a second magnet disposed on the second yoke; and
a coil that is penetrated by the third yoke and is movable in the first direction by magnetic forces of the first magnet and the second magnet,
wherein the coil includes a first section in which a winding wire is linearly wound and a second section in which the wiring wire is wound in an arc shape,
wherein the first yoke and the second yoke each have a rectangular shape when viewed from the first direction, and
wherein a diameter of a virtual cylinder whose outer peripheral surface coincides with a part of an outer peripheral surface of the third yoke is larger than a length in a longitudinal direction of the rectangular shape.

2. The voice coil motor according to claim 1, wherein the second section faces the first section with the third yoke interposed therebetween.

3. The voice coil motor according to claim 1, wherein the coil has a substantially D-shape when viewed from the first direction.

4. The voice coil motor according to claim 1, wherein a surface of the third yoke facing the first section is substantially parallel to the first section.

5. The voice coil motor according to claim 1, wherein a cross point at which winding wires of the coil cross each other is located in the first section.

6. The voice coil motor according to claim 1, wherein a first plane including a first side surface, which faces the first magnet, of the first yoke intersects with a second plane including a second side surface, which faces the second magnet, of the second yoke, and wherein the third yoke is located between an intersection line between the first plane and the second plane and the first section of the coil.

7. The voice coil motor according to claim 1, further comprising:

a fourth yoke connecting first ends of the first yoke, the second yoke, and the third yoke in the first direction; and a fifth yoke connecting second ends of the first yoke, the second yoke, and the third yoke in the first direction, wherein the first yoke, the second yoke, and the fifth yoke are integrally formed by one member.

8. The voice coil motor according to claim 7, wherein in the first direction, a distance between the fourth yoke and the first magnet and a distance between the fourth yoke and the second magnet are shorter than a distance between the fifth yoke and the first magnet and a distance between the fifth yoke and the second magnet.

9. The voice coil motor according to claim 7, wherein the third yoke has protruding portions on respective end surfaces of the third yoke in the first direction, and wherein the fourth yoke and the fifth yoke include engagement portions that engage with the protruding portions, respectively.

10. A lens barrel comprising the voice coil motor according to claim 1.

11. The lens barrel according to claim 10, further comprising:

a lens; and a lens holding frame that holds the lens and is connected to the coil, wherein the voice coil motor is disposed so that the first direction is parallel to an optical axis of the lens, and wherein the third yoke is located between the first section of the coil and the lens in a radial direction of the lens.

12. A voice coil motor comprising:

a first yoke and a second yoke each having a length in a first direction;

a third yoke that has a length in the first direction and is disposed between the first yoke and the second yoke;

a first magnet disposed on the first yoke;

a second magnet disposed on the second yoke; and a coil that is penetrated by the third yoke and is movable in the first direction by magnetic forces of the first magnet and the second magnet, wherein the coil includes a first section in which a winding wire is linearly wound and a second section in which the wiring wire is wound in an arc shape, and wherein a cross point at which winding wires of the coil cross each other is located in the first section.

13. The voice coil motor according to claim 12, wherein the second section faces the first section with the third yoke interposed therebetween.

14. The voice coil motor according to claim 12, wherein the coil has a substantially D-shape when viewed from the first direction.

15. The voice coil motor according to claim 12, wherein a surface of the third yoke facing the first section is substantially parallel to the first section.

16. The voice coil motor according to claim 12, wherein a first plane including a first side surface, which faces the first magnet, of the first yoke intersects with a second plane including a second side surface, which faces the second magnet, of the second yoke, and wherein the third yoke is located between an intersection line between the first plane and the second plane and the first section of the coil.

17. A lens barrel comprising the voice coil motor according to claim 13.

18. A voice coil motor comprising:

a first yoke and a second yoke each having a length in a first direction;

a third yoke that has a length in the first direction and is disposed between the first yoke and the second yoke;

a fourth yoke connecting first ends of the first yoke, the second yoke, and the third yoke in the first direction;

a fifth yoke connecting second ends of the first yoke, the second yoke, and the third yoke in the first direction, a first magnet disposed on the first yoke;

a second magnet disposed on the second yoke; and a coil that is penetrated by the third yoke and is movable in the first direction by magnetic forces of the first magnet and the second magnet, wherein the coil includes a first section in which a winding wire is linearly wound and a second section in which the wiring wire is wound in an arc shape, and wherein the first yoke, the second yoke, and the fifth yoke are integrally formed by one member.

19. The voice coil motor according to claim 18, wherein in the first direction, a distance between the fourth yoke and the first magnet and a distance between the fourth yoke and the second magnet are shorter than a distance between the fifth yoke and the first magnet and a distance between the fifth yoke and the second magnet.

20. The voice coil motor according to claim 18, wherein the third yoke has protruding portions on respective end surfaces of the third yoke in the first direction, and wherein the fourth yoke and the fifth yoke include engagement portions that engage with the protruding portions, respectively.

* * * * *